(12) United States Patent
Kaneda et al.

(10) Patent No.: US 10,039,264 B2
(45) Date of Patent: Aug. 7, 2018

(54) GROOMING BOX

(71) Applicant: DREAM INDUSTRY Co., Ltd., Wakayama-shi, Wakayama (JP)

(72) Inventors: Takashi Kaneda, Wakayama (JP); Mitsuhiro Kaneda, Wakayama (JP); Norio Saeki, Iwade (JP)

(73) Assignee: DREAM INDUSTRY CO., LTD., Wakayama-Shi, Wakayama (JP)

( * ) Notice: Subject to any disclaimer, the term of this patent is extended or adjusted under 35 U.S.C. 154(b) by 293 days.

(21) Appl. No.: 14/784,573

(22) PCT Filed: May 28, 2015

(86) PCT No.: PCT/JP2015/065478
§ 371 (c)(1),
(2) Date: Oct. 14, 2015

(87) PCT Pub. No.: WO2015/182728
PCT Pub. Date: Dec. 3, 2015

(65) Prior Publication Data
US 2016/0157463 A1    Jun. 9, 2016

(30) Foreign Application Priority Data
May 30, 2014  (JP) ................. 2014-113327

(51) Int. Cl.
*A01K 13/00*  (2006.01)
(52) U.S. Cl.
CPC .................. *A01K 13/001* (2013.01)
(58) Field of Classification Search
CPC ............... A01K 13/001; A01K 13/00
USPC .......................... 119/606, 668, 603
See application file for complete search history.

(56) References Cited

U.S. PATENT DOCUMENTS

| | | | | |
|---|---|---|---|---|
| 4,505,229 A | * | 3/1985 | Altissimo | A01K 13/001 119/668 |
| 4,730,576 A | * | 3/1988 | Yoshikawa | A01K 13/001 119/673 |
| 4,846,783 A | * | 7/1989 | Koch | A61G 11/00 600/22 |
| 4,936,824 A | * | 6/1990 | Koch | A61G 11/00 128/205.26 |
| 7,011,044 B2 | * | 3/2006 | Segura Jobal | A01K 13/001 119/669 |
| 7,100,538 B2 | * | 9/2006 | Motomura | A01K 13/001 119/604 |

(Continued)

FOREIGN PATENT DOCUMENTS

| | | |
|---|---|---|
| JP | 2004298151 A | 10/2004 |
| JP | 3153110 U | 8/2009 |

*Primary Examiner* — Joshua D Huson
(74) *Attorney, Agent, or Firm* — Alleman Hall Creasman & Tuttle LLP

(57) ABSTRACT

A grooming box is provided in order to easily install member(s) and a work space for pet grooming anywhere, efficiently collect groomed hair, and prevent the groomed hair from scattering outside the grooming box. The grooming box is a compact, easily assemblable and portable box so that members necessary for grooming is accommodated compactly in the box in vertical directions, and a work space where a groomer works is foldably formed. Further, the grooming box includes an air circulating type cleaning device, an air curtain device, and an ion generating device.

11 Claims, 9 Drawing Sheets

(56) References Cited

U.S. PATENT DOCUMENTS

| | | | |
|---|---|---|---|
| 7,497,188 B2* | 3/2009 | Cho ................. | A01K 13/001 |
| | | | 119/604 |
| 8,544,419 B1* | 10/2013 | Spalding ............ | A01M 1/06 |
| | | | 119/651 |
| 2008/0053379 A1* | 3/2008 | Markewitz .......... | A01K 13/00 |
| | | | 119/600 |
| 2012/0118244 A1* | 5/2012 | Finch ................ | A01K 13/001 |
| | | | 119/600 |
| 2016/0135428 A1* | 5/2016 | Nicholson .......... | A01K 13/003 |
| | | | 119/604 |

* cited by examiner

GROOMING BOX

TECHNICAL FIELD

The present invention relates to a grooming (including trimming) box which can easily install member(s) and a work space necessary for pet grooming at any places, particularly to the grooming box which prevents groomed hair from scattering outside the grooming box, and has a hair collecting function.

BACKGROUND ART

Conventionally, a grooming table, a cleaning bathtub, a work bench, etc., are placed in a work space for grooming pets and are used for a grooming work, thereby requiring a large work space. When beginning a grooming enterprise, equipments, such as the grooming table, a sink, and a vacuum cleaner, which require a large space must be prepared. Thus, a large work space must be prepared, and a large amount of fund is required to establish the enterprise.

Since groomed hair is scattered to a space and onto a floor of the work space, a significant amount of fallen hair is generated in a work room. Dog hair has weight of about several ten percents of human hair, and can be scattered by a weak wind. Therefore, a groomer normally wears a mask etc. to prevent the hair from entering into his/her body system.

Further, although the dog hair scattered on the floor needs to be cleaned up by the vacuum cleaner etc. after the dog is groomed, the dog hair is danced in air by exhaust air from the vacuum cleaner. Therefore, there are disadvantages, such as a loss of working time is caused, a thorough clean-up is difficult, the soaring dog hair is not good for health.

Further, the dog hair adheres to clothes, surrounding members, etc. by static, thereby, increasing the difficulty of the clean-up. Further, there are disadvantages, such as the dog hair adhered to height locations near the ceiling is difficult to be removed.

Further, an air-conditioner used in the work space needs to be cleaned up frequently.

Meanwhile, as for a grooming table provided with a function to collect the groomed hair, the following invention is proposed.

JP2004-298151A (Patent Document 1) proposes an "animal grooming table" which aims at advantageously removing floating matters caused at the time of grooming an animal. The animal grooming table is characterized in the following. A top plate where an animal is placed and which has a work surface where a grooming is performed is provided. A suction port is formed in the top plate to open in the work surface. A suction passage is formed inside a supporting body which supports the top plate. The suction passage sucks floating matters produced at the time of grooming through the suction port. A vacuum device is provided, which produces a suction force which sucks the floating matters and air via the suction passage.

Further, JP3153110U (Patent Document 2) proposes a "cosmetic table of pet animals" which aims at providing the cosmetic table of pet animals where a grooming etc. can be performed sanitarily. The cosmetic table is characterized in the following. An air discharge side of a fan is connected with a discharge port via an air-feeding chamber. An air suction side of the fan is connected with a suction port via a dust accumulating chamber and a filter. An exhaust port which communicates with outside air is formed in the air-feeding chamber described above. The suction port which is formed so as to oppose to the discharge port opens horizontally.

However, since the above-described grooming tables do not disclose a function to prevent the groomed hair from scattering outside, residual hair which was not collected or the fallen hair which floats in the grooming room space contaminate the perimeter like before. Therefore, the loss of working time, health problem, etc. are fundamentally unsolvable.

REFERENCE DOCUMENT(S) OF CONVENTIONAL ART

Patent Document(s)

Patent Document 1: JP2004-298151A
Patent Document 2: JP3153110U

DISCLOSURE OF THE INVENTION

Problems to be Solved by the Invention

A first purpose of the present invention is to provide a grooming box which can easily install member(s) and a work space necessary for pet grooming at any places. A second purpose of the present invention is to provide a grooming box which efficiently collects groomed hair within the grooming box, and prevents the groomed hair from scattering outside the grooming box, and thereby a groomer inhales no scattered hair and a cleaning time after grooming is shorten.

SUMMARY OF THE INVENTION

In order to achieve the first purpose, the invention is a compact, easily assemblable and portable box, a cleaning bathtub is incorporated into a front half of the box below a grooming table so that one or more members necessary for grooming is accommodated compactly in vertical directions, and an area above the grooming table serves as a grooming space, a work space where a groomer works is formed in a rear half of the box in a state where an opening-and-closing door is open, the work space is folded and stored by closing the opening-and-closing door so that the box is able to be stored compactly.

In order to achieve the second purpose, the grooming box described above may include an air circulating type cleaning device. A plurality of discharge port may be vertically formed in one of side faces of the grooming space, while a plurality of suction ports may be vertically formed in the other side face so that air is blown from the discharge ports and the air is sucked into the suction ports to collect groomed hair by a filter.

In the grooming box described above, a number of slit-like discharge ports may be formed in an opening edge of the grooming space in the side face where the discharge ports are formed, while a number of slit-like suction ports may be formed in the opening edge of the grooming space in the other side face where the suction ports are formed so that fallen hair that floats in the grooming space is not scattered outside.

In the grooming box described above, an air curtain device may be constituted by providing a piping to an opening edge of the grooming space, and forming a number of air discharge ports in the piping so that fallen hair that floats in the grooming space is not scattered outside.

In the grooming box described above, an ion generating element for generating negative ions may be provided near the air discharge ports of the piping. The ion generating element generates negative ions to remove static from hair, peripheral members, and clothing of the groomer so that fallen hair drops vertically.

In the invention, an electrostatic strap may be provided in the grooming box described above so that fallen hair that floats in the grooming space is adsorbed to electrostatic strap.

In the invention, an ion generating device may be provided in the grooming box described above to cancel electric potentials of objects inside the grooming box to zero.

In the grooming box described above, a space below the cleaning bathtub incorporated below the grooming table may be entirely usable as an air chamber.

In the grooming box described above, a disk-shaped plate may be rotatably provided to an upper surface of the grooming table, and a discharge port may be formed in the grooming table plate, on a lower surface side of the disk-shaped plate to supply air from the air chamber.

In the invention, an air curtain fan motor may be provided in the air chamber described above.

In the invention, a dryer motor may be provided in the air chamber described above.

The grooming box described above may include a cleaning device, an air curtain device, and an ion generating device. A human body detection sensor may be provided above the grooming table so that, when the groomer enters into the grooming box, the cleaning device, the air curtain device, and the ion generating device automatically operate at the same time, and, when the groomer finishes a grooming work and leaves the grooming box, the cleaning device and the air curtain device operate at the maximum rates for a predetermined period of time to clean hair remaining in the grooming space.

Effects of the Invention

As described above, according to the present invention, since the members necessary for grooming are accommodated compactly in the grooming box in vertical directions, and the work space where the groomer works inside the grooming box is foldably formed, the members and the work space can easily be installed at any places and can be compactly stored when not used.

Further, by providing the air circulating type cleaning device, the air curtain device, and the ion generating device in the grooming box, groomed hair is efficiently collected within the grooming box and the groomed hair is prevented from scattering outside the grooming box, and thus, the groomer inhales no scattered hair and a cleaning time after grooming can be shortened.

BRIEF DESCRIPTION OF DRAWING(S)

MODE(S) FOR CARRYING OUT THE INVENTION

Figure 1:
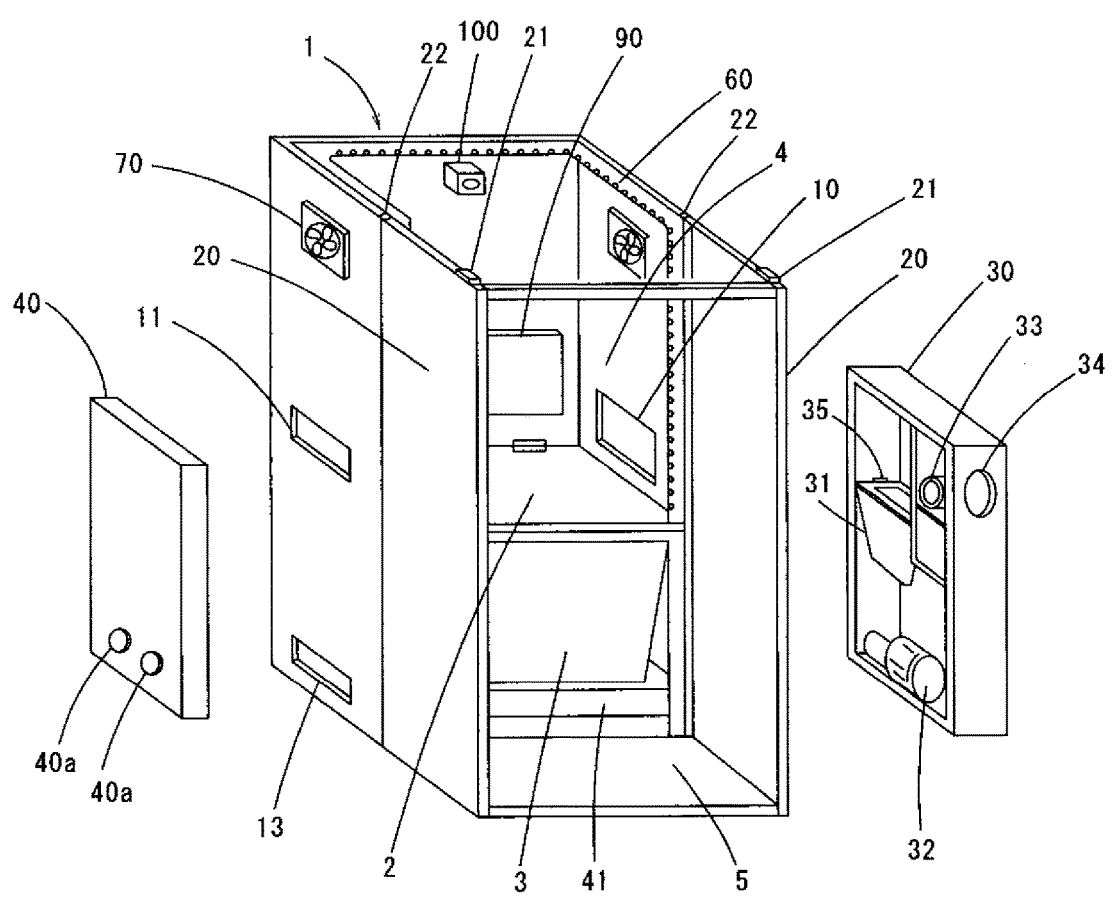
FIG. 1 is a perspective view illustrating one example of a grooming box of the present invention.
Figure 2:
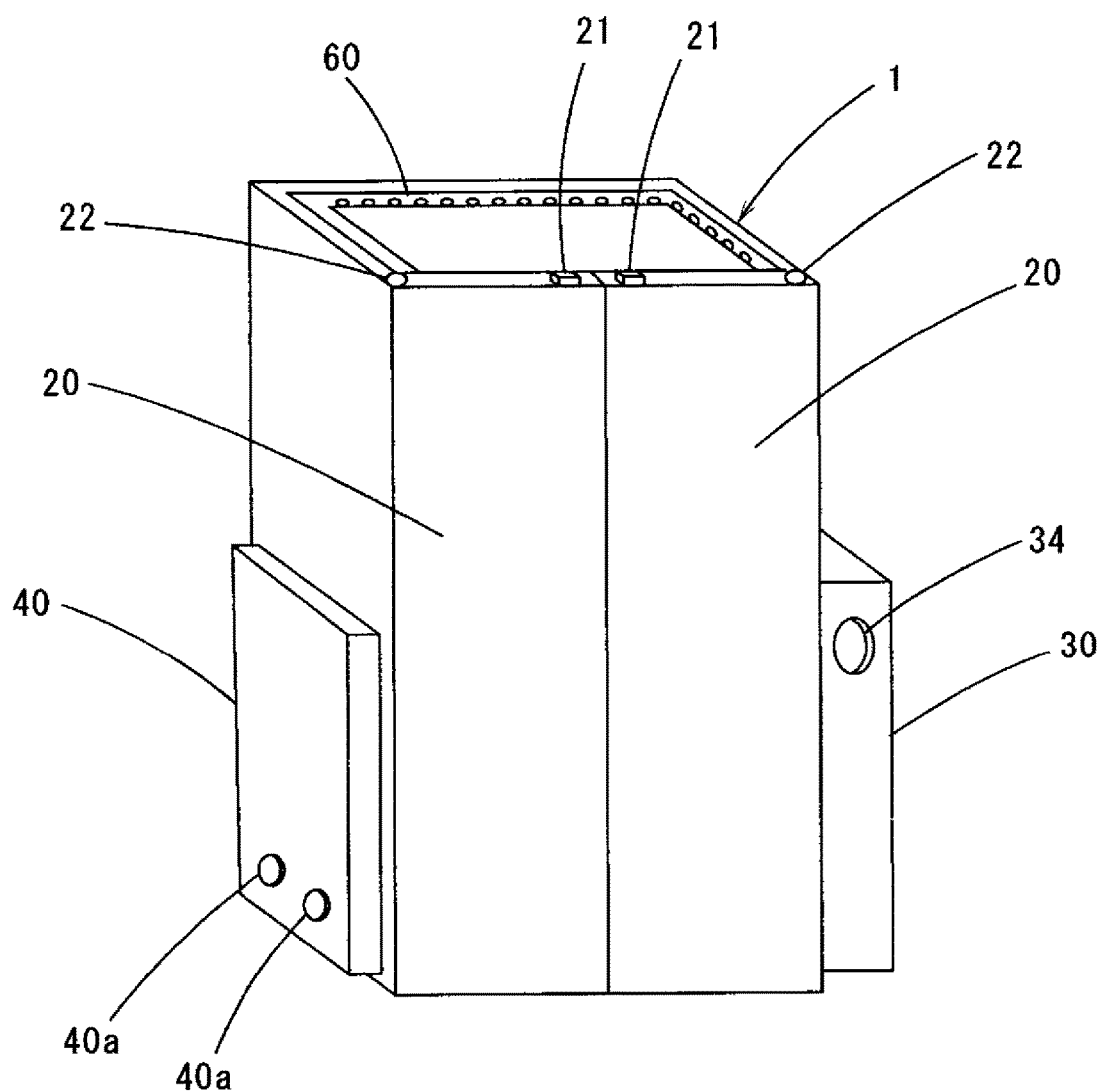
FIG. 2 is a perspective view illustrating a state where the grooming box of FIG. 1 is stored.
Figure 3:
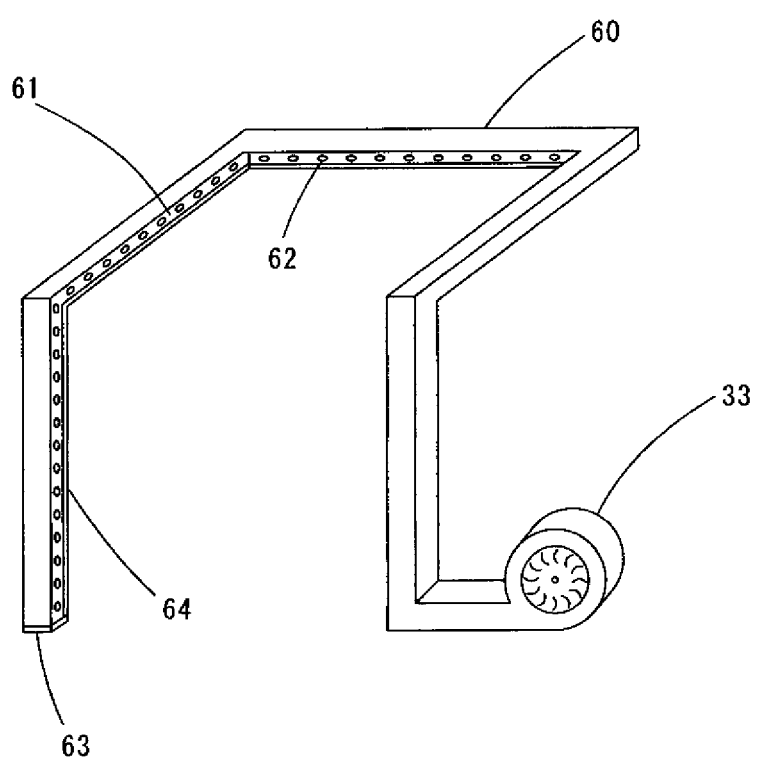
FIG. 3 is a perspective view of an air curtain device illustrated in FIG. 1.
Figure 4:
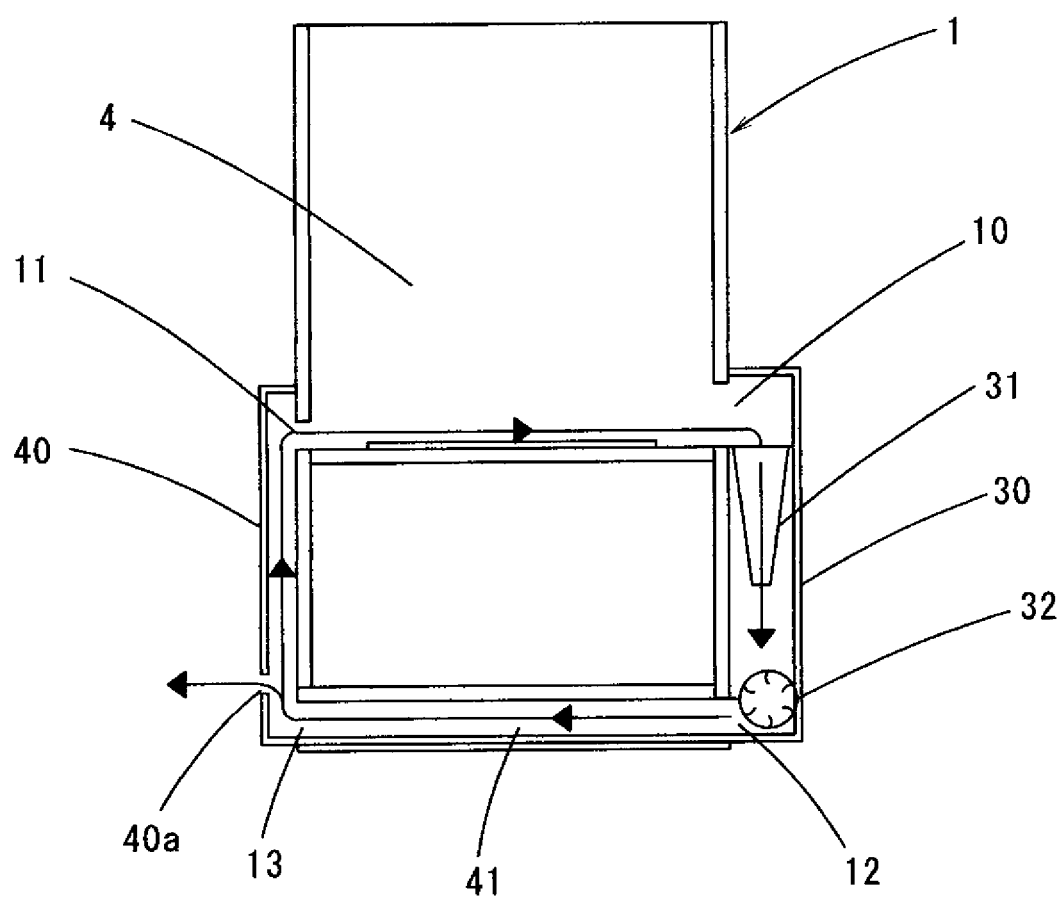
FIG. 4 is a view illustrating one example of a flow of air at the time of cleaning.

Hereinafter, one example of an embodiment (a first embodiment) of the present invention is described with reference to the accompanying drawings. FIG. 1 is a perspective view illustrating one example of a grooming box of the present invention, FIG. 2 is a perspective view illustrating a state where the grooming box of FIG. 1 is stored, FIG. 3 is a perspective view of an air curtain device illustrated in FIG. 1, and FIG. 4 is a view illustrating one example of a flow of air at the time of cleaning Note that each structure of the grooming box of the present invention is not limited to the following embodiments and can suitably be changed according to a situation of use.

A grooming box 1 is compact, and is made of material and has a structure which allow the grooming box 1 to be simply assembled and portable. As illustrated in FIG. 1, a grooming table 2 necessary for grooming and a cleaning bathtub 3 below the grooming table 2 are incorporated into a substantially front half of the grooming box 1 in vertical directions. An upper area of the grooming table 2 serves as a grooming space 4. A work space 5 where a groomer works is formed in a substantially rear half of the grooming box 1. Doors 20 are pivotable by pivot metals 22, and can be fixed by locks 21. The work space 5 is foldably formed, and as illustrated in FIG. 2, the doors 20 are closed when not used, and thereby the grooming box 1 can be stored compactly.

The grooming box 1 is provided with an air circulating type cleaning device. Groomed hair is collected by a flow of a small amount of air, simultaneously using exhaust air and suction air from a cleaning fan motor 32 attached to a control box 30. A suction port 10, a discharge port 11, a ventilation port 12 (see FIG. 4), and a ventilation port 13 are formed in side walls on both sides of the grooming box 1. As illustrated in FIG. 4, as for a flow of air at the time of cleaning, air fed from the cleaning fan motor 32 passes through a ventilation guide 41 from the ventilation port 12. The air flows from the ventilation port 13 to the ventilation guide 40, and are then discharged into the grooming space 4 from the discharge port 11. Floating hair and groomed hair are pushed toward the suction port 10, and are then collected by the filter 31. The suction port 10 and the discharge port 11 are not be limited to the illustrated structures, but, as described later, a plurality of ports are preferred to be formed in the vertical directions (see FIGS. 5 to 9). Note that the control box 30 is fixed to the grooming box 1 with screws etc.

As illustrated in FIG. 1, a filter detection sensor 35 is disposed near the filter 31 in the control box 30. Thus, since hair will be discharged outside the grooming box 1 from exhaust ports 40*a* when having forgotten to attach the filter 31, such an operation without the filter 31 can be prevented.

The grooming box 1 is provided with the ventilation guide 40. In order to make the pressure inside the grooming space 4 negative and to suck air inside the grooming space 4 from the suction port 10, the exhaust ports 40*a* which discharge a part of air fed from the cleaning fan motor 32 are formed in the ventilation guide 40. Note that the ventilation guide 40 is fixed to the grooming box 1 with screws etc.

The grooming box 1 is provided with an air curtain device 60. In order not to scatter the floating hair inside the grooming space 4 outside, an air curtain piping 61 having many discharge ports 62 is disposed in an opening edge of the grooming space 4. As illustrated in FIG. 3, an air curtain fan motor 33 which supplies air at high pressure is attached to one of tip ends of the air curtain piping 61. The other tip end is closed with a plug 63. An ion generating element 64 for destaticizing members inside the grooming space 4 is disposed at the air curtain piping 61. Note that the air curtain fan motor 33 and the cleaning fan motor 32 are rotated at low speed during a grooming; however, these motors are rotated at high speed after the grooming to collect residual dog hair.

The grooming box 1 is provided with ion generating devices 70 with an air feeder. Since objects inside the grooming space 4 are destaticized, the floating hair does not adhere to the surrounding objects and naturally falls, thereby easily collecting the floating hair. Further, in order to prevent the hair from being scattered, the grooming box 1 is provided with an electrostatic strap 90 which draws the floating dog hair with static to prevent the scattering.

Figure 5:
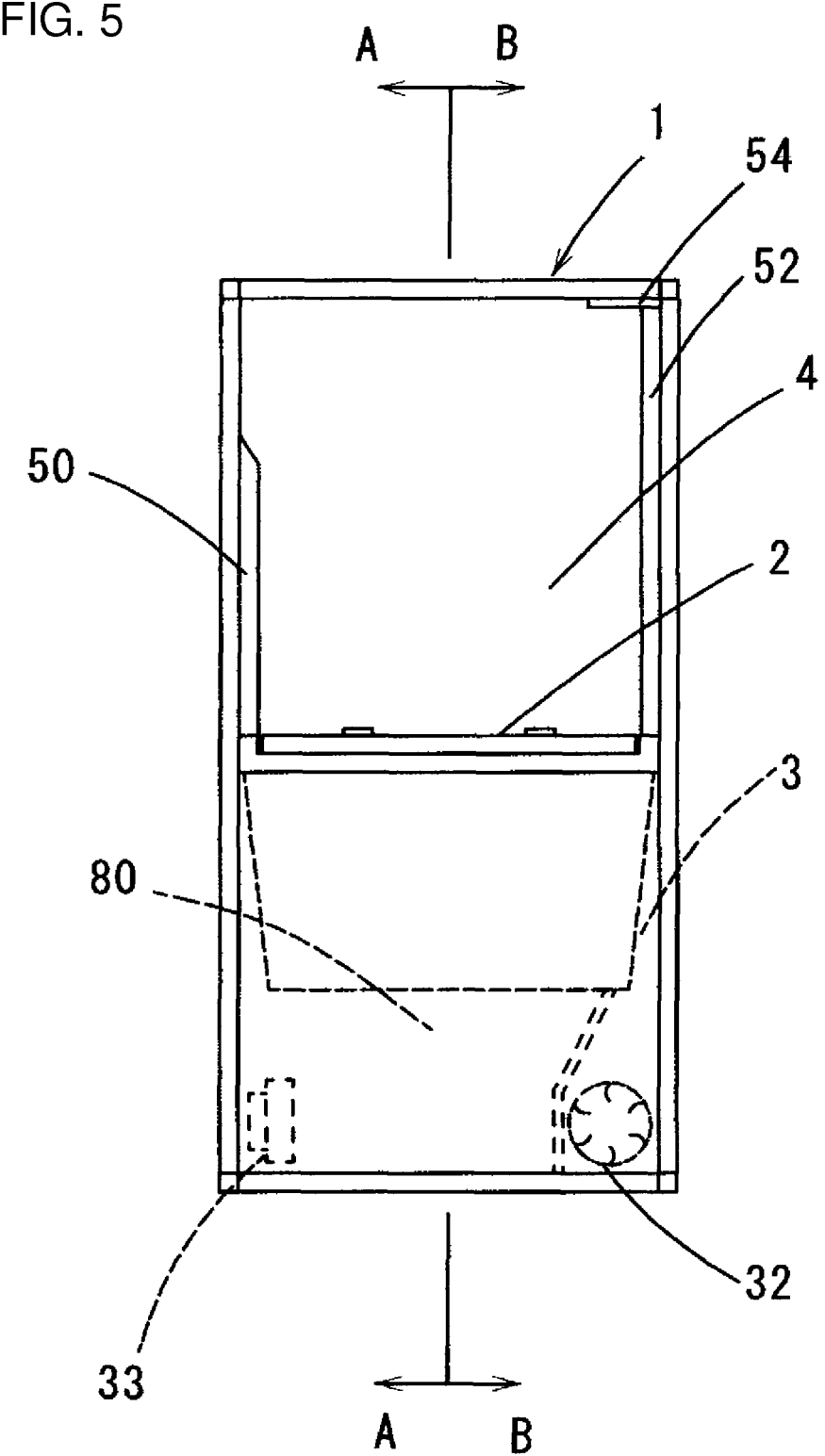
FIG. 5 is a front elevational view illustrating another grooming box of the present invention.
Figure 8:
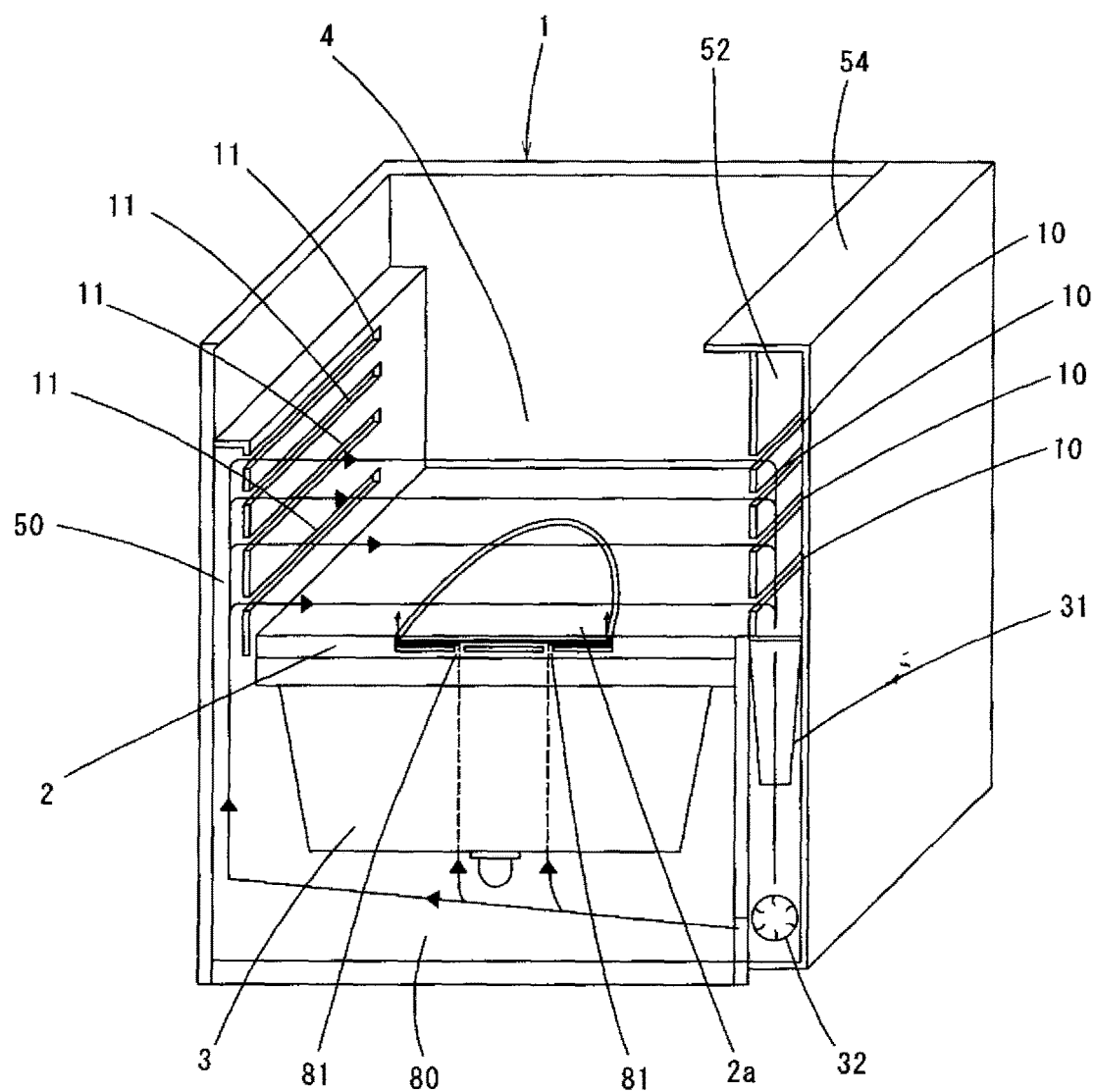
FIG. 8 is a view illustrating another flow of air at the time of cleaning.
Figure 9:
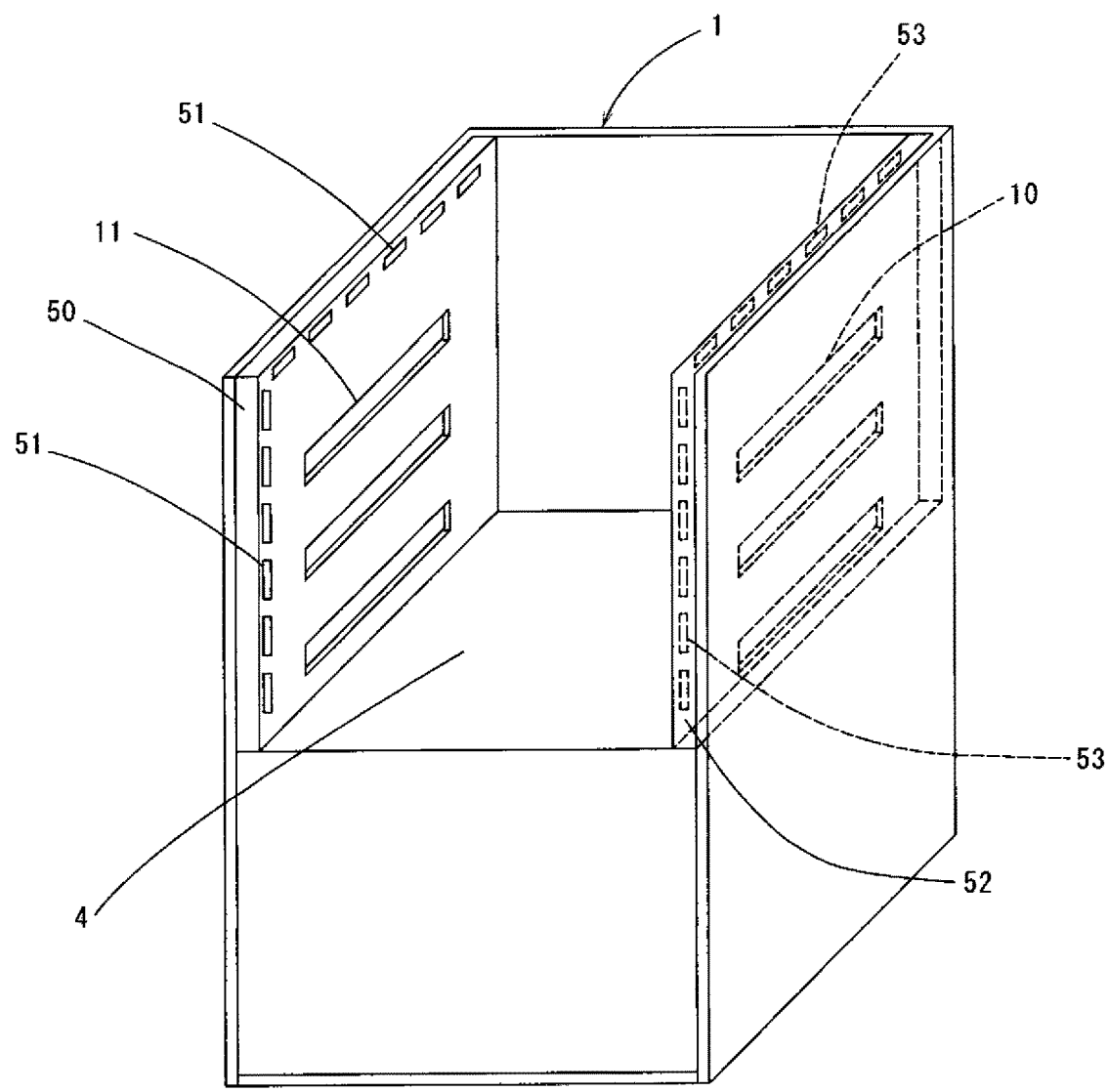
FIG. 9 is a perspective view illustrating another ventilation guide illustrated in FIG. 5.

Next, another example of the embodiment (a second embodiment) of the present invention is described with reference to the accompanying drawings. FIG. 5 is a front elevational view illustrating another grooming box of the present invention, FIG. 6 is a cross-sectional view taken along a line A-A of FIG. 5, FIG. 7 is a cross-sectional view taken along a line B-B of FIG. 5, FIG. 8 is a view illustrating another flow of air at the time of cleaning, and FIG. 9 is a perspective view illustrating another ventilation guide illustrated in FIG. 5.

Figure 6:
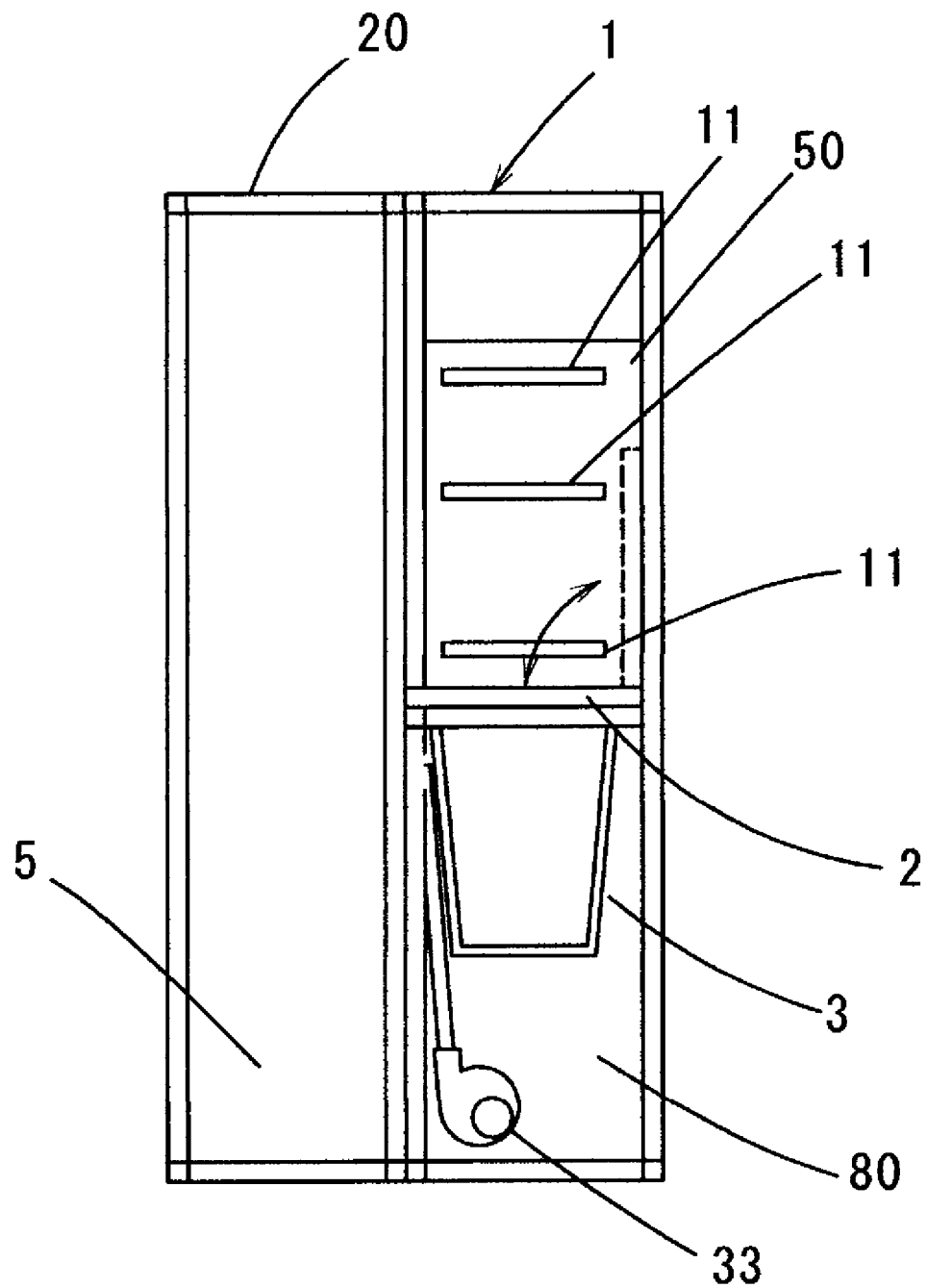
FIG. 6 is a cross-sectional view taken along a line A-A of FIG. 5.
Figure 7:
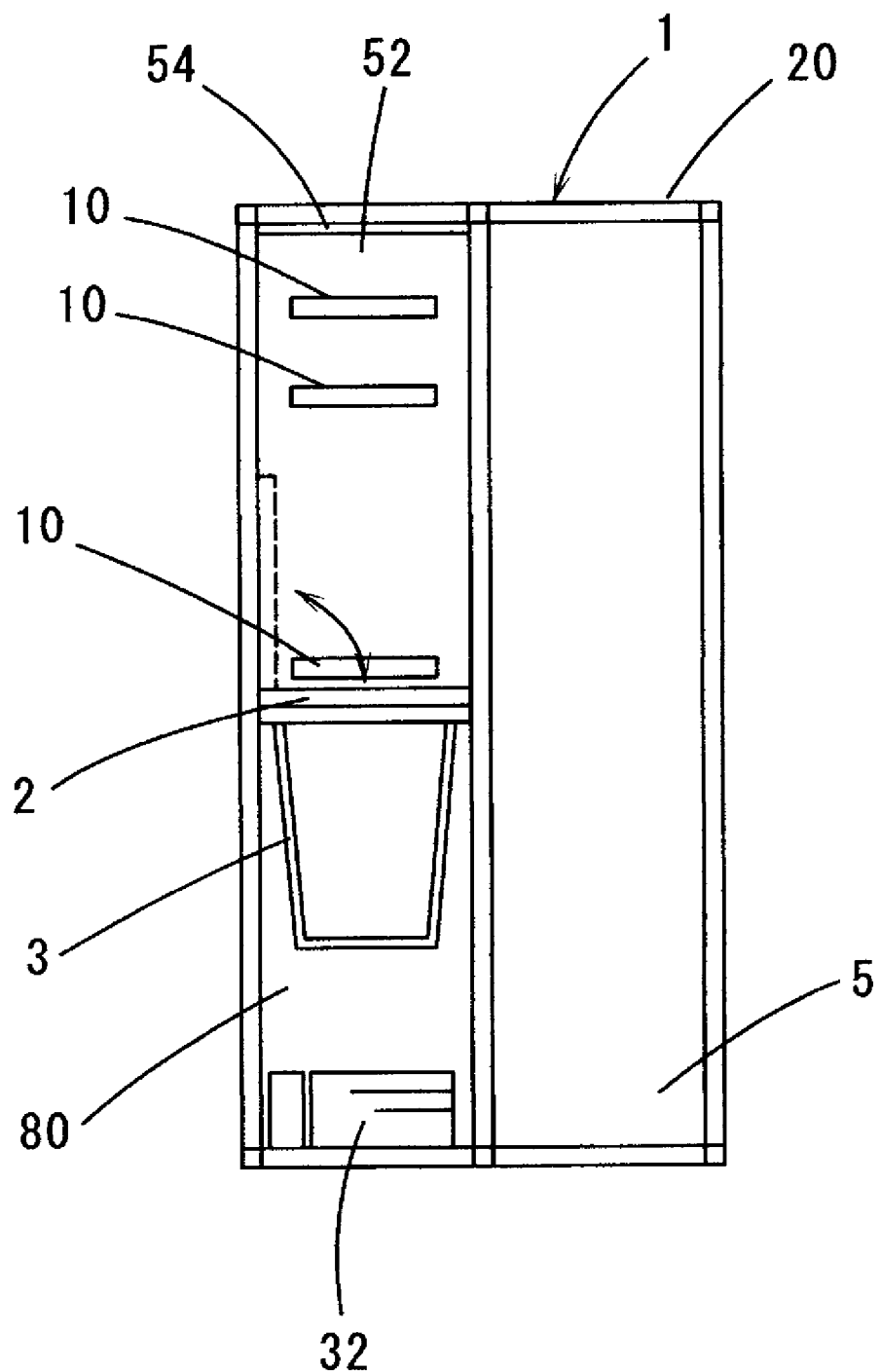
FIG. 7 is a cross-sectional view taken along a line B-B of FIG. 5.

As illustrated in FIGS. 5 to 7, a grooming table 2 necessary for grooming and a cleaning bathtub 3 below the grooming table 2 are incorporated into a substantially front half of a grooming box 1 in vertical directions, similar to the first embodiment described above. An upper area of the grooming table 2 serves as a grooming space 4. A work space 5 where a groomer works is formed in a substantially rear half of the grooming box 1. The grooming box 1 is compact, and is made of material and has a structure which allow the grooming box 1 to be simply assembled and portable. Similar to the first embodiment described above, the work space 5 is formed so as to be foldable, and doors 20 are closed when not used, and thereby the grooming box 1 can be stored compactly (see FIG. 2).

On the other hand, in the second embodiment, dissimilar to the first embodiment described above, a space below the bottom of the cleaning bathtub 3 incorporated under the grooming table 2 of the grooming box 1 is entirely used as an air chamber 80 to prevent an entry of dust from outside. Further, an air curtain fan motor 33, a dryer motor (illustration is omitted), etc. are disposed within the air chamber 80. Thereby, the wind pressure of a cleaning fan motor 32 is added to the wind pressure of the air curtain fan motor 33 to boost the wind pressure.

The grooming box 1 is provided with an air circulating type cleaning device, similar to the first embodiment described above. Groomed hair is collected by a flow of a small amount of air, simultaneously using exhaust air and suction air from the cleaning fan motor 32. A ventilation guide 50 is provided to one of side faces of the grooming space 4 of the grooming box 1, a plurality of discharge ports 11 are formed at different heights, a ventilation guide 52 is provided to the other side face, and a plurality of suction ports 10 are formed at different heights. As illustrated in FIG. 8, as for a flow of air at the time of cleaning, air fed from the cleaning fan motor 32 passes through the air chamber 80, is discharged into the grooming space 4 from the plurality of discharge ports 11 through the ventilation guide 50. Floating hair and groomed hair are pushed toward the plurality of suction ports 10, and are then collected by a filter 31 after passing through the ventilation guide 52. A covering 54 is provided in an upper part of the ventilation guide 52 for preventing the scattered dog hair from escaping.

Further, as illustrated in FIG. 8, in order to facilitate the grooming, a rotary plate 2a is rotatably attached to an upper surface of the grooming table 2. Discharge ports 81 are formed in the grooming table 2 below the rotary plate 2a so that air is supplied from the air chamber 80. Thus, an entry of dog hair and dust into a gap at a side face or a lower surface of the rotary plate 2a, or into the air chamber 80 is prevented, thereby reducing burden of cleaning As illustrated in FIG. 9, a number of slit-like discharge ports 51 are formed in the side face of the ventilation guide 50 where the plurality of discharge ports 11 are formed, in an opening edge of the grooming space 4. Further, a number of slit-like suction ports 53 are formed in the other side face of the ventilation guide 52 where the plurality of the suction ports 10 are formed, in the opening edge of the grooming space 4. Thus, similar to the air curtain device 60 described above, the effect of preventing the scattering of the floating fallen hair inside the grooming space 4 outside can be demonstrated.

Moreover, in the grooming box of the present invention, as illustrated in FIG. 1, a system may be configured as follows. A human body detection sensor 100 is provided above the grooming table 2. The cleaning fan motor 32, the air curtain fan motor 33, and the ion generating devices 70 are configured to be actuated automatically when the groomer enters into the box. The cleaning fan motor 32 and the air curtain fan motor 33 are configured to operate at the maximum rate for a certain period of time after the groomer finished the grooming and left the box. Further, a manual button switch (illustration is omitted) may also be provided so that, when an operator wants to clean the grooming room (space), the operator can clean the grooming room with a brush etc. while operating the cleaning fan motor 32 and the air curtain fan motor 33 at the maximum rate.

DESCRIPTION OF REFERENCE CHARACTERS

1 Grooming Box
2 Grooming Table
2a Rotary Plate
3 Cleaning Bathtub
4 Grooming Space
5 Work Space
10 Suction Port
11 Discharge Port
12 Ventilation Port
13 Ventilation Port
20 Door
21 Lock
22 Pivot Metal
30 Control Box
31 Filter
32 Cleaning Fan Motor
33 Air Curtain Fan Motor
34 Air Intake Port
35 Filter Detection Sensor
40 Ventilation Guide
40a Exhaust Port 41 Ventilation Guide
50 Ventilation Guide
51 Discharge Port
52 Ventilation Guide
53 Suction Port
54 Covering
60 Air Curtain Device
61 Air Curtain Piping
62 Discharge Port
63 Plug
64 Ion Generating Element
70 Ion Generating Device with Air Feeder
80 Air Chamber
81 Discharge Port
90 Electrostatic Strap
100 Human Body Detection Sensor

What is claimed is:

1. A grooming box comprising:
a compact, easily assembled and portable box;
a cleaning bathtub incorporated into a front half of the box below a grooming table so that one or more grooming members are accommodated compactly in vertical directions;
an area above the grooming table that serves as a grooming space;
a work space formed in a rear half of the box in a state where an opening-and-closing door is open, wherein the work space is configured to be folded and stored by closing the opening-and-closing door so that the box is able to be stored compactly;
an air circulating type cleaning device including a plurality of discharge ports vertically formed in a side face of the grooming space and a plurality of suction ports vertically formed in another side face of the grooming space so that air is blown from the discharge ports and the air is sucked into the suction ports to collect groomed hair in a filter; and
a human body detection sensor provided above the grooming table so that, when a groomer enters into the grooming box, the air circulating type cleaning device operates automatically.

2. The grooming box of claim 1, wherein a number of slit-like discharge ports are formed in an opening edge of the grooming space in the side face where the discharge ports are formed, while a number of slit-like suction ports are formed in the opening edge of the grooming space in the other side face where the suction ports are formed so that fallen hair that floats in the grooming space is not scattered outside.

3. The grooming box of claim 1, wherein an air curtain device is constituted by providing a piping to an opening edge of the grooming space, and forming a number of air discharge ports in the piping so that fallen hair that floats in the grooming space is not scattered outside.

4. The grooming box of claim 3, wherein an ion generating element for generating negative ions is provided near the air discharge ports of the piping, the ion generating element generating negative ions to remove static from hair, peripheral members, and clothing of the groomer so that fallen hair drops vertically.

5. The grooming box of claim 1, wherein an electrostatic strap is provided in the grooming box so that fallen hair that floats in the grooming space is adsorbed to electrostatic strap.

6. The grooming box of claim 1, wherein an ion generating device is provided in the grooming box to cancel electric potentials of objects inside the grooming box to zero.

7. The grooming box of claim 1, wherein a space below the cleaning bathtub incorporated below the grooming table is entirely usable as an air chamber.

8. The grooming box of claim 7, wherein a disk-shaped plate is rotatably provided to an upper surface of the grooming table, and a discharge port is formed in the grooming table plate, on a lower surface side of the disk-shaped plate to supply air from the air chamber.

9. The grooming box of claim 7, wherein an air curtain fan motor is provided in the air chamber.

10. The grooming box of claim 7, wherein a dryer motor is provided in the air chamber.

11. A grooming box comprising:
a compact, easily assembled and portable box;
a cleaning bathtub incorporated into a front half of the box below a grooming table so that one or more grooming members are accommodated compactly in vertical directions;
an area above the grooming table that serves as a grooming space;
a work space formed in a rear half of the box in a state where an opening-and-closing door is open, wherein the work space is configured to be folded and stored by closing the opening-and-closing door so that the box is able to be stored compactly;
a cleaning device;
an air curtain device;
an ion generating device; and
a human body detection sensor provided above the grooming table so that, when a groomer enters into the grooming box, the cleaning device, the air curtain device, and the ion generating device automatically operate at the same time, and, when the groomer finishes a grooming work and leaves the grooming box, the cleaning device and the air curtain device operate for a predetermined period of time to clean hair remaining in the grooming space.

* * * * *